(No Model.)

G. H. SCOFIELD.
DRAFT EQUALIZER.

No. 366,691. Patented July 19, 1887.

Witnesses
C. S. Taylor
C. E. Doyle

Inventor
Geo. H. Scofield
By his Attorneys,
C. A. Snowles

N. PETERS, Photo-Lithographer, Washington, D. C.

UNITED STATES PATENT OFFICE.

GEORGE HENRY SCOFIELD, OF HAY CREEK, MINNESOTA.

DRAFT-EQUALIZER.

SPECIFICATION forming part of Letters Patent No. 366,691, dated July 19, 1887.

Application filed April 26, 1887. Serial No. 236,215. (No model.)

*To all whom it may concern:*

Be it known that I, GEORGE HENRY SCOFIELD, a citizen of the United States, residing at Hay Creek, in the county of Goodhue and State of Minnesota, have invented a new and useful Improvement in Draft-Equalizers, of which the following is a specification.

My invention relates to improvements in draft-equalizers; and it consists in a certain novel construction and arrangement of parts for service, fully set forth hereinafter, and specifically pointed out in the appended claims.

My present invention comprises an improvement upon the draft-equalizer shown and described in the Letters Patent granted to Staiger and Scofield on September 21, 1886, and bearing the number 349,372.

Figure 1:
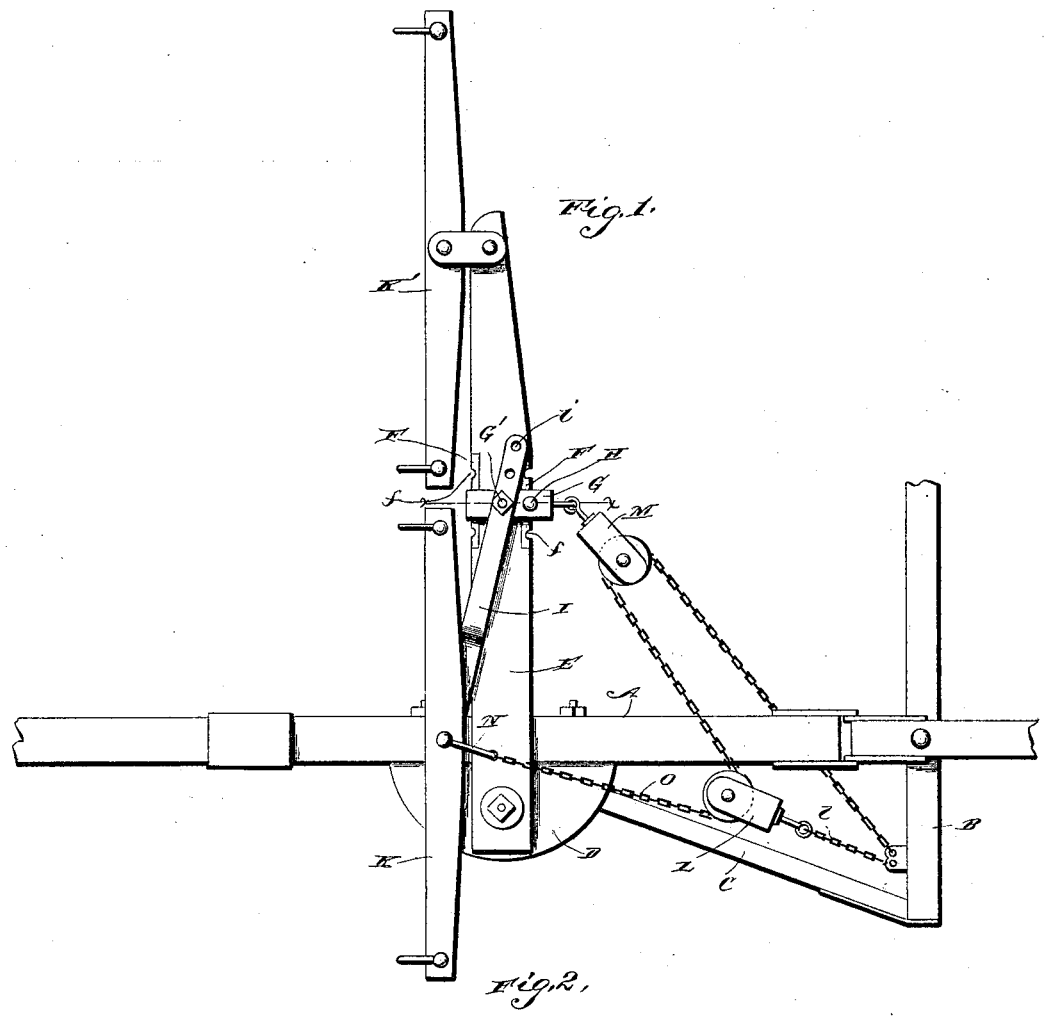
Figure 2:
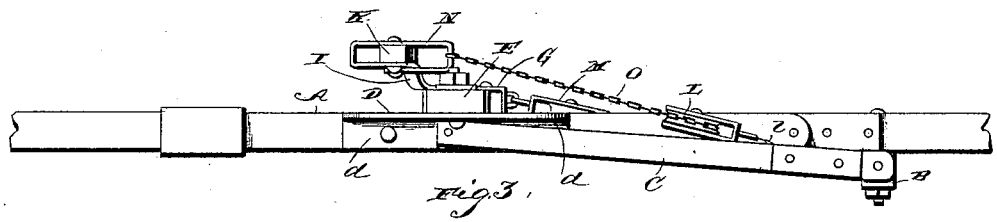
Figure 3:
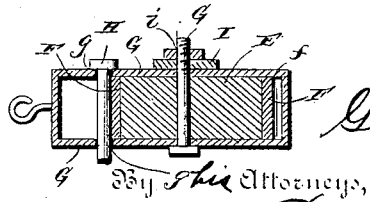

In the drawings hereto annexed, Figure 1 is a plan view of the device for equalizing the draft in harvesters, &c., embodying my improvements. Fig. 2 is a side view of the same. Fig. 3 is a detail section on the line $x\,x$, Fig. 1.

Referring to the drawings by letter, A designates the draft-beam, B the transverse bar of the harvester, to which the rear end of the said beam is secured, and C the brace-bar, secured at one end to the outer or "grain" end of the said transverse bar and at the other to the draft-beam at a point forward of the said bar B.

D is a segmental bracket or plate having a downturned flange, $d$, bolted to the same side of the draft-beam as the brace C, at a suitable point in the length thereof, and having a vertical pivot-bolt secured therein, on which is journaled the end of the draft-equalizing bar E, which extends over and some distance beyond the said beam.

F F are plates secured to the front and rear sides of the said equalizing-bar, and having series of vertical grooves $f\,f$ therein, and G is a sleeve adapted to embrace and slide on the bar E, provided with vertically-aligned openings $g\,g$, adapted to receive a pin, H. The said sleeve is adapted to be held in the desired position on the bar E by placing it in the said position and passing the vertical pin H down through the openings $g\,g$, and causing it to engage in one of the grooves $f$, and thus hold the sleeve rigid.

I represents a lever-bar, having a series of openings, $i$, near one end, adapted to have the bolt G' (which is secured at one end to the upper side of the sleeve G) passed therethrough. On the opposite end of the said lever is pivoted the center of the doubletree K, and at the opposite or free end of the equalizing-bar E is pivoted the center of the doubletree K'. Near the said outer end of the transverse-bar B is secured the end of the short chain $l$, having a pulley, L, on the front end, and M is also a swinging pulley pivoted on the rear side of the sleeve G.

To a link, N, secured to the center of the doubletree K, is attached the front end of the draft-chain O, which passes to the rear around the pulley L, forward and around the pulley M, and thence rearwardly to the transverse bar B, to which it is attached near the outer or grain end, close to the point where the end of the short chain $l$ is attached. There are several advantages gained by this construction over that shown in the said previous patent.

By securing the flange of the segmental plate D on the side of the draft-beam, the said beam is braced to prevent its splitting, and by forming the coupling as herein described there are no openings or perforations formed in the equalizing-bar, which tend, when employed, to weaken the same, and, on the other hand, the plates provided at that point strengthen the said bar. The manner of adjusting the coupling, also, is very simple, and there is no risk of the parts becoming loose and slipping out of place; also, by attaching the draft-chain to a point near the outer end of the transverse bar B, or close to the cutting or grain side of the machine, all side draft is obviated, this being not entirely eliminated in the equalizer set forth in the said patent to Staiger and Scofield.

I can carry the rear end of draft-chain from pulley M to point on which short chain $l$ is attached to under draft-beam, if necessary to avoid neck-draft on horses, or above said beam, if not found necessary.

Having thus described the construction and advantages of my invention, I claim—

1. The combination of the draft-beam A, transverse bar B, segmental bracket D, having a flange, $d$, bolted to the beam A, equalizing-bar E, pivoted at one end to the said bracket, lever-bar I, pivoted to the bar E, doubletrees K and K' on the ends of the lever I and the bar E, respectively, the pulley L, secured by a chain, l, near the outer end of the bar B, pulley M, secured to the center of the bar E, and the draft-chain secured at one end to the center of the doubletree K, passing around the pulleys L and M, and attached to the bar B near the outer end, substantially as and for the purpose set forth.

2. The combination of the beam A, transverse bar B, bracket D, equalizing-bar E, pivoted on the said bracket, lever-bar I, pivoted to the bar E, doubletree K, pivoted to the outer end of the lever I, the doubletree K', pivoted at the outer end of the bar E, link N, pivoted to the tree K, the short chain l, secured to the outer end of the bar B, pulley L thereon, pulley M, attached to the center of the equalizing-bar, and the chain secured at one end to the link N, at the other end to the outer end of the bar B, and adapted to pass around and operate on the pulleys L and M, substantially as and for the purpose set forth.

3. The combination of the draft-beam A, bracket D, equalizing-bar E, plates F at the center of the said bar, grooves $f\,f$ therein, sleeve G, having aligned openings $g\,g$ in the upper and lower sides, pin H to pass therethrough and engage in one of the series of grooves $f$, swinging lever I, having a series of perforations, $i$, in the end, bolt G', to pass through one of the said perforations, doubletrees K K', pulleys L and M, and the chain O, to pass around said pulleys, substantially as and for the purpose hereinbefore set forth.

4. In combination with the draft-beam A, the equalizing-bar E, the lever I, adjustably connected to the bar E, the whiffletrees connected to the lever I and bar E, the adjustable pulley M, connected to the bar E, the pulley L, and the chain O, as set forth.

In testimony that I claim the foregoing as my own I have hereto affixed my signature in presence of two witnesses.

GEORGE HENRY SCOFIELD.

Witnesses:
 FRANK DURIG,
 W. H. H. BRUCE.